Feb. 27, 1962     A. J. RICHARDS     3,022,687
METHOD OF RIVETING
Original Filed Nov. 20, 1953
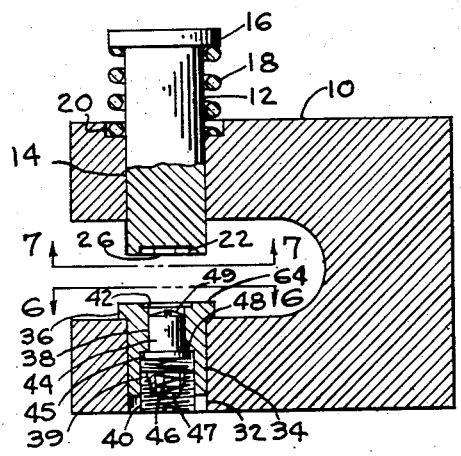
FIG.1
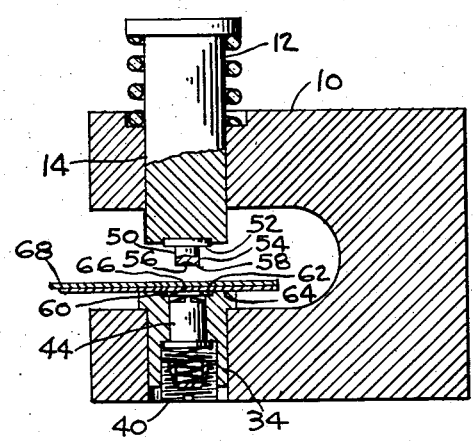
FIG.2
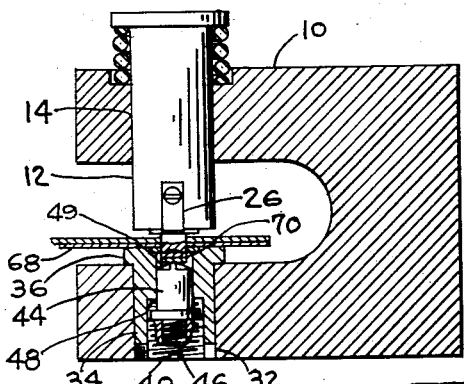
FIG.3
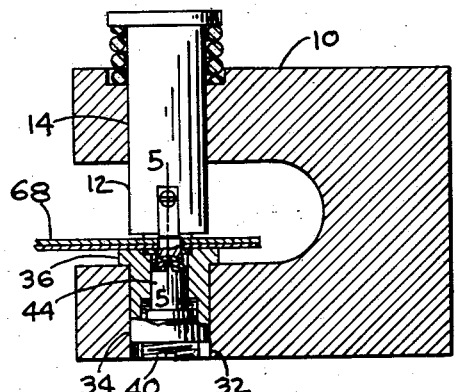
FIG.4
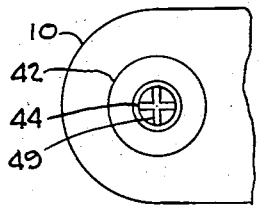
FIG.6
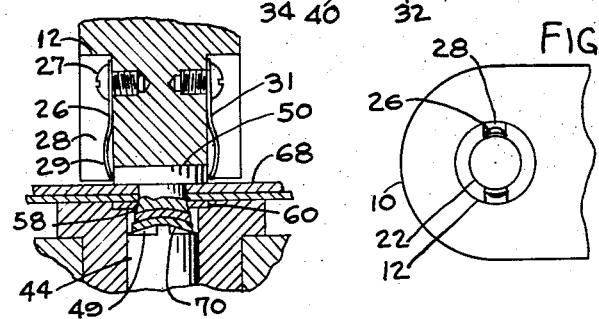
FIG.5
FIG.7
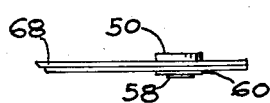
FIG.8
INVENTOR.
Arthur J. Richards

United States Patent Office 3,022,687
Patented Feb. 27, 1962

3,022,687
METHOD OF RIVETING
Arthur J. Richards, 4240 Yorkshire, Detroit, Mich.
Original application Nov. 20, 1953, Ser. No. 393,393, now Patent No. 2,914,972, dated Dec. 1, 1959. Divided and this application Sept. 21, 1959, Ser. No. 841,074
2 Claims. (Cl. 78—46)

The present invention relates to a method of joining sheet material together with a rivet and is a division of my co-pending application Serial No. 393,393 filed November 20, 1953, now Patent No. 2,914,972.

It is an object of the present invention to provide a method for joining a plurality of pieces of metal together by a rivet with the rivet punching its own aperture through the metal.

It is another object of the present invention to provide a method for joining a plurality of pieces of metal together by a rivet with the rivet punching its own aperture through the metal and having a washer act as a die for the rivet.

It is still a further object of the present invention to provide a method for joining a plurality of pieces of metal together by a rivet with the rivet punching its own aperture through the metal having a washer act as a die for the rivet and peening over the end of the rivet against the washer with the use of one apparatus and in a continuous operation.

It is still a further object of the present invention to provide a method for joining a plurality of pieces of metal together by a rivet with the rivet punching its own aperture through the metal and having a washer act as a die for the rivet that is adaptable for either manual or machine operation.

Other objects and features of the invention will become apparent as the description proceeds especially when taken in conjunction with the accompanying drawings.

FIGURE 1 shows the apparatus partly in cross section and partly broken away.

FIGURE 2 shows the apparatus partly in cross section and partly broken away with a rivet and washer in place ready to join together two pieces of sheet metal.

FIGURE 3 is a view similar to FIG. 2 with the rivet having punched an aperture through the pieces of metal.

FIGURE 4 is a view similar to FIG. 3 with the end of the rivet peened over the washer.

FIGURE 5 is an enlarged view taken through the line 5—5 of FIG. 4.

FIGURE 6 is a view taken in the direction of the arrows 6—6 of FIG. 1.

FIGURE 7 is a view taken in the direction of arrows 7—7 FIG. 1.

FIGURE 8 shows the pieces of metal after being joined by the rivet and washer.

Referring now to the drawings 10 is the body portion of the apparatus for carrying out the invention. The ram 12 is of a diameter to have a sliding fit in the bore 14 of the body and has an enlarged portion 16 against which the spring 18 abuts. The spring acts to return the ram to its inoperative position and is seated in the counterbore 20. The other end of the ram has a bored recess 22 for the reception of a rivet. A spring 26 best seen in FIG. 5 is attached to the ram 12 by means of the screw 27 the ram being cut away at 28 to provide clearance for the spring when the ram is drawn through the bore 14. The spring is slightly curved at 29. The spring 31 is the same as spring 26 and is attached to the opposite side of the ram in the same manner.

The bore 32 in the body portion 10 is in alignment with the bore 14. The die holder 34 has a press fit in the bore 32 with the shoulder 36 abutting against the body portion to hold the die holder against downward pressure of the ram. A bore 38 extends through the die holder and has its enlarged lower end 39 threaded to receive a slotted screw 40. The opposite or upper end of the die holder is counterbored at 42. The insert 44 is of a diameter to have a sliding fit in the bore 38 and has an enlarged portion 45 at its lower end. A spring 46 fits in the bore 47 of the screw 40 and holds the portion 45 against the shoulder 48. The insert 44 has formed at its upper end ridges 49. The ridges extend from the center of the insert downwardly at a slight angle. The insert is preferably made of steel that is hardened by heat treatment.

The rivet 50 has a head 52 that is of a diameter to fit snugly into the recess 22 of the ram where it is held in place by the springs 26 and 31. The thickness of the head allows it to project slightly beyond the end of the ram. The shank 54 of the rivet is of an optimum diameter that will require a minimum of pressure to punch an aperture through the metal to be joined and large enough so that the end of the shank will not distort under pressure. The end of the shank is recessed at 56 leaving a flat surface 58 around the end.

The washer 60 fits snugly into the counterbore 42 with the surface 62 of the washer flush or slightly above the surface 64 of the dieholder. The axis of the counterbore 42 is in alignment with the axis of the bore 14 that holds the ram so that the shank of the rivet will be centrally located with respect to the aperture 66 of the washer. The aperture of the washer has a diameter slightly larger than the diameter of the shank 54 of the rivet to provide adequate die clearance when the shank passes through in the punching operation.

To perform the riveting operation the rivet 50 is placed in position in the recess 22 of the ram. The pieces of metal 68 to be joined are placed over the washer 60 that has been previously placed in the counterbore 42, with the spot where it is desired to have the rivet pass through located under the center of the rivet. A pressure is now exerted downwardly against the top of the enlarged portion 16 of the ram of sufficient force to press the shank of the rivet through the metal being joined. As best seen in FIG. 3 the slugs 70 that have been sheared by the rivet shank come against the ridges 49 at the top of the insert. The insert is pushed downwardly against the pressure of the spring 46 until it comes to rest against te top of the set screw 40. The set screw is adjusted in the bore so that when the insert comes to rest the slugs 70 have both passed through the aperture of the washer. The length of the shank 54 of the rivet is such that when the slugs contact the top of the insert the rivet can be forced further downward to perform the peening operation. Continued pressure on the ram forces the rivet further downward with the slugs being compressed between the end of the rivet and the top of the insert. The ridges 49 make indentations in the slugs and coact with the slugs in peening over the surface 58 against the washer. Upon release of the pressure the ram is returned to its inoperative position by the spring 18 and the insert 44 is pushed against the shoulder 48 by the spring 46 ejecting the slugs.

The rivet punches an aperture through the metal the exact size of its shank so that the shank fits tightly in the aperture. The rivet head presses the pieces of metal firmly against the washer and the washer is held in place by the peened over end of the rivet holding the assembly tightly together.

The apparatus can be adapted for manual or machine operation. For manual operation sufficient pressure can be obtained by use of a hand punch and if desired the ram, die holder and associated apparatus can be adapted to the body of the punch. For machine operation the apparatus can be placed upon the bolster plate of a power press with the ram of the press exerting its pressure upon the ram of the apparatus.

The length of the rivet shank can be varied to suit the combined thickness of the gages of metal desired to be joined to allow the end of the shank to project beyond the washer a sufficient amount to be peened over. For joining two pieces of mild steel up to approximately 20 gage a rivet of mild steel can be used. For joining pieces of mild steel of thicker gages a rivet made of steel harder than the metal being joined is more desirable with heavier pressures being exerted on the ram to pierce the metal and peen the rivet. The hardness of the washer that acts as the die should be such that it is not deformed when the rivet punches the aperture.

Various kinds of material can be joined by the apparatus. Softer material such as aluminum and copper can be joined by a rivet and washer of the same material with the hardness of the rivet and washer being suitable for the thickness of the material being joined.

Such modifications of my invention may be employed as lie within the scope of the appended claims without departing from the spirit and intention of the invention.

What I claim as my invention is:

1. The method of forcing a rivet through unperforated sheet metal by providing a washer to underlie the metal and act as die for the rivet, the aperture of the washer being slightly larger than the shank of the rivet and peening the end of the rivet over the washer which comprises securing the rivet in a ram adapted for movement toward a die holder holding the washer, the aperture of the washer being in alignment with the shank of the rivet, forcing the rivet through the metal by movement of the rivet toward the washer and shearing a slug out of the metal, arresting the slug sheared from out of the metal by an anvil underlying the washer after the slug and end of the rivet have passed through the aperture in the washer, continuing the movement of the rivet with the anvil exerting pressure against the slug and forcing the slug against the end of the rivet to peen the end of the rivet over the washer all in one stroke.

2. The method of joining a plurality of pieces of unperforated sheet metal together with a rivet by providing a washer to underlie the pieces of metal and act as a die for the rivet, the aperture of the washer being slightly larger than the shank of the rivet and peening the end of the rivet over the washer which comprises securing the rivet in a ram adapted for movement toward a die holder holding the washer, the aperture of the washer being in alignment with the shank of the rivet, forcing the rivet through the metal by movement of the rivet toward the washer and shearing slugs out of the metal, arresting the slugs sheared from out of the metal by an anvil underlying the washer after the slugs and end of the rivet have passed through the aperture in the washer, continuing the movement of the rivet with the anvil exerting pressure against the slugs and forcing the slugs against the end of the rivet to peen the end of the rivet over the washer all in one stroke.

References Cited in the file of this patent

UNITED STATES PATENTS

| | | |
|---|---|---|
| 504,280 | Reed | Aug. 29, 1893 |
| 556,367 | George | Mar. 17, 1896 |
| 1,152,971 | Reis | Sept. 7, 1915 |
| 1,600,517 | Sibley | Sept. 21, 1926 |
| 1,719,480 | Linden | July 2, 1928 |
| 2,896,755 | Levine | July 28, 1959 |